United States Patent [19]
Hall

[11] 3,764,248
[45] Oct. 9, 1973

[54] TRANSFER MOLD FOR REDUCING RAM FLASH
[75] Inventor: Harold E. Hall, Middlefield, Ohio
[73] Assignee: Stewart Rubber Company, Bedford, Ohio
[22] Filed: Sept. 3, 1971
[21] Appl. No.: 177,775

[52] U.S. Cl. 425/251, 425/DIG. 228, 425/DIG. 806, 264/297
[51] Int. Cl. ............................ B29f 3/10, B29h 1/00
[58] Field of Search............ 425/250, 251, DIG. 51, 425/DIG. 228, 247, 242, DIG. 806; 249/105, 110; 264/297, 328

[56] References Cited
UNITED STATES PATENTS
2,900,663  8/1959  Lindhorst........................ 425/357 X
2,777,411  1/1957  Geisler............................ 264/328 X
2,883,704  4/1959  Jurgeleit......................... 425/250 X
3,557,270  1/1972  Waid............................... 264/328 X FOREIGN PATENTS OR APPLICATIONS
994,417  11/1951  France............................ 425/245

Primary Examiner—J. Spencer Overholser
Assistant Examiner—David S. Safran
Attorney—James H. Tilberry et al.

[57] ABSTRACT

A ram transfer mold having a plurality of channel areas in the bottom wall extending between and interconnecting the plurality of sprue holes in order to permit raw material to flow laterally therealong as the ram is forced into the reservoir and into an extremely close spaced relationship with the bottom wall. The channel areas permit the ram to approach the bottom wall more closely than heretofore possible and reduce the scrap ram flash generated during each heat.

4 Claims, 4 Drawing Figures

PATENTED OCT 9 1973  3,764,248
Fig. 1.
PRIOR ART
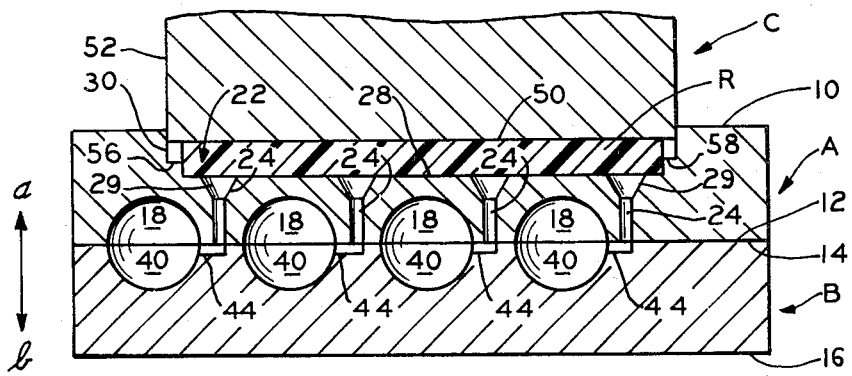
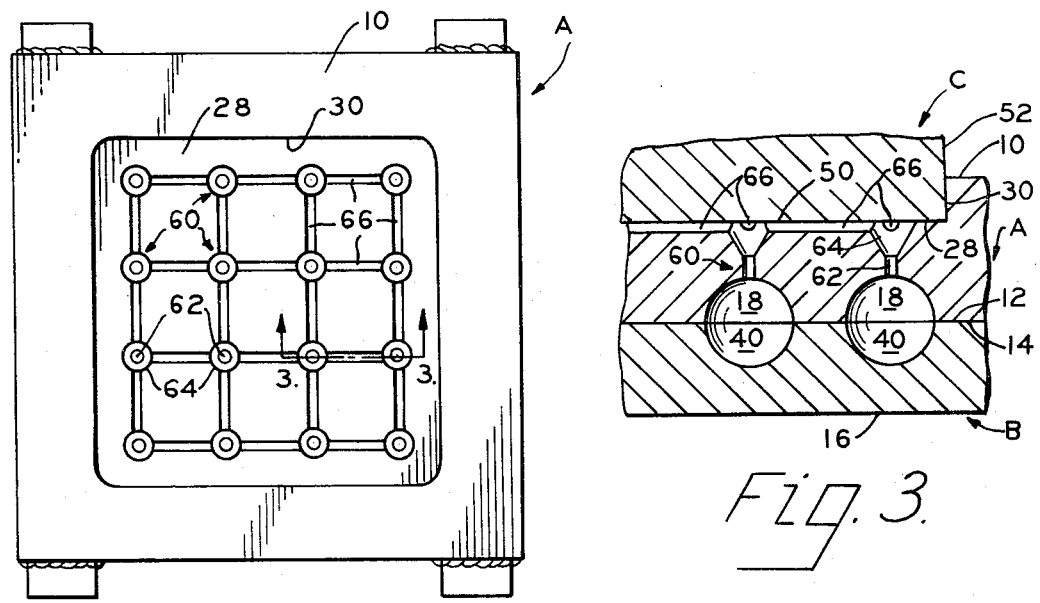
Fig. 2.
Fig. 3.
Fig. 4.
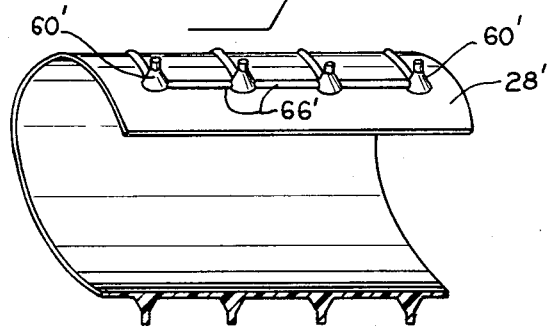
INVENTOR.
HAROLD E. HALL
BY
Meyer, Tilberry & Body
ATTORNEYS.

TRANSFER MOLD FOR REDUCING RAM FLASH

This application pertains to the art of molding and more particularly to transfer molding.

The invention is particularly applicable to ram transfer molds of the type used for molding rubber products and will be described with particular reference thereto; however, it will be appreciated that the invention has broader applications and may be employed in other instances where it is desired to mold articles from other materials in transfer type molds.

Transfer molding is a term generally applied to a process of forming articles in a closed mold from a predetermined amount of uncured rubber which is loaded into a material reservoir or pot and then forced through a plurality of sprue holes into a corresponding plurality of heated mold cavities by the application of pressure where the rubber is permitted to cure. This type of molding is favored in that it permits close tolerances to be held on all mold and workpiece dimensions. Also, because of the almost complete absence of flash on the articles being molded, the variation in dimensions from article to article is extremely slight. However, there are certain intrinsic limitations to using transfer molding, that is, any ram flash or raw material remaining in the reservoir and sprue holes following molding and curing must be discarded as it too has been cured. Therefore, transfer molding has not been particularly well suited for molding quite small pieces because of the relatively high proportion of waste material in the reservoir and sprue holes.

The pressure to force the uncured rubber from the reservoir and into the workpiece forming cavities is provided by a ram which is forcibly inserted into the reservoir and against the uncured rubber. Heretofore, it has been necessary to assure that the ram would not extend closer than a certain minimum distance toward the bottom wall of the reservoir in order to permit the uncured raw material to flow laterally throughout the reservoir and into and through the sprue holes. If the final or closed distance between the ram and bottom wall was less than the minimum distance, the molding process would be inefficient as the viscosity of the uncured rubber would prevent a consistent material flow from being realized so that certain of the workpiece forming cavities in the mold would not be completely filled and additional scrap would thus be generated. Because of the space required to assure proper material flow within the reservoir during the molding process, it has become the practice within the trade to merely "accept" the scrap ram flash generated during molding as merely being a necessary expense of using the transfer molding process.

The present invention contemplates an improved ram transfer mold which overcomes all of the above referred problems and others and provides means for reducing ram flash which is simple, economical to employ, and readily adaptable to any ram transfer mold utilizing a material reservoir or pot.

In accordance with the present invention, there is provided an improvement for a ram transfer mold of the type wherein uncured raw material is received in a reservoir disposed in the mold itself with the bottom wall of the reservoir interconnected to workpiece forming cavities within the mold by a plurality of sprue holes. Means are disposed in the bottom wall of the reservoir for permitting the uncured raw material to flow within the reservoir and to the plurality of sprue holes when the ram is brought into an extremely close spaced relationship with the bottom wall.

In accordance with a limited aspect of the present invention, the means for permitting material flow are a plurality of channel areas disposed so as to extend along the surface of the bottom wall.

The principal object of the present invention is the provision of improved ram transfer molds which reduces the amount of scrap ram flash generated during each heat.

Yet another object of the present invention is the provision of an improvement for ram transfer molds which reduces the amount of raw material required for each heat.

Still another object of the present invention is the provision of an improvement for ram transfer molds which is readily adaptable to molds employing any configuration of sprue hole location within the reservoir.

Another object of the present invention is the provision of an improvement for ram transfer molds which may be readily incorporated into existing ram transfer molds.

The invention may take physical form in certain parts and arrangements of parts, a preferred embodiment of which will be described in detail in this specification and illustrated in FIGS. 2 and 3 of the accompanying drawings which form a part hereof and wherein:

FIG. 1 is a cross sectional schematic showing in a general way the parts and operation of a ram transfer mold;

FIG. 2 is a plan view of a ram transfer mold employing the concepts of the subject invention with the ram removed therefrom for ease of illustration;

FIG. 3 is a cross sectional view taken along lines 3—3 in FIG. 2; and,

FIG. 4 is a view of the scrap ram flash generated in the reservoir and sprue holes when using a mold incorporating the concepts of the subject invention as shown in FIGS. 2 and 3.

Referring now to the drawings wherin the showings are for the purposes of illustrating the preferred embodiment of the invention only and not for purposes of limiting same, FIG. 1 show a typical the prior art ram transfer mold, and FIGS. 2 and 3 show a ram transfer mold embodiment in accordance with the present invention, in both cases the mold being comprised of an upper mold half generally designated A, a lower mold half generally designated B and a ram generally designated C. These components may be constructed from tool quality steel as is conventional in the mold construction field.

The upper mold half includes a flat top portion 10 and a flat bottom portion 12 and the lower mold half includes a flat top portion 14 and a flat bottom portion 16. Disposed in bottom portion 12 are a plurality of upper workpiece cavity areas 18 which are interconnected with a raw material reservoir or pot 22 by sprue holes 24. Generally, the cavity areas are identical with each other in order that a plurality of identical workpieces may be molded in one operation and, in FIG. 1 and FIG. 3, are merely generally shown and do not represent cavity areas for any particular workpiece. The specific number of cavity areas may vary depending on the size of the workpiece to be formed and the mold size, with 50 such cavities not being uncommon. Reservoir 22 includes a bottom wall 28 and continuous side wall 30. It should be noted that the dimensions and configurations of the reservoir, sprue holes and cavity portions are well known in the art and that the sprue holes may include a conical lead-in area 29 adjacent bottom wall 28 to provide for ease of material flow as is also known in the art.

Lower mold half B includes a plurality of lower cavity areas 40 oppositely disposed from cavity areas 18 and runners 44 asscoiated therewith in order to connect the cavity areas with sprue holes 24. It is to be appreciated that each combination of cavity areas 18 and 40 form a separate workpiece forming cavity. Again, as the specifics of the cavities do not form a part of the present invention, they are not more fully described or shown.

Ram C includes a generally flat bottom 50 and an outer peripheral surface 52. The dimension of the surface 52 is such that it may be closely received in reservoir 22 against continuous side wall 30 thereof as is known in the art.

In using the above described ram transfer mold, ram C is generally mounted stationarily on a press and upper and lower mold halves A and B are both mounted for selective generally vertical reciprocation in the directions designated $a$ and $b$ in FIG. 1. The means for effecting this reciprocation may be provided by any of several types of presses generally utilized in the rubber molding industry and which do not form a part of the present invention and are therefore not shown in detail. It should be further noted that lower mold half B is movable vertically downward a greater distance than upper mold half A in order that the two halves may be separated for removing finished workpieces as will hereinafter become more readily apparent.

To use the mold as shown in FIG. 1, the mold halves are moved to their lowermost vertical position in direction $b$ so that there is a space provided between ram C and the upper mold half for inserting the raw material into reservoir 22 and a space between the upper and lower mold halves so that the previously molded workpieces may be removed. A premeasured, generally by weight, amount of uncured rubber R which has been formulated, as is known, to accommodate a particular workpiece requirement is placed in reservoir 22. The lower mold half is then moved vertically upward until it contacts and carries with it the upper mold half. With the meeting of the mold halves at bottom and top portions 10, 14, the corresponding cavity areas 18, 40 form the plurality of workpiece forming cavities interconnected with reservoir 22 by sprue holes 24 and runners 44. Together, the mold halves are further directed upwardly until ram C engages reservoir 22 with outer peripheral surface 52 being closely received relative to continuous side wall 30. As the mold halves are further directed upwardly, the ram enters further into the reservoir so that flat bottom 50 acts against the premeasured quantity of uncured rubber thereby forcing the raw material laterally to and then through sprue holes 24 and runners 44 into the associated workpiece forming cavities. As can be appreciated, it is therefore necessary to provide means for allowing the raw material to flow throughout the reservoir in order that it may be equally distributed among the workpiece forming cavities. Because of the nature of the uncured rubber, it is therefore necessary to provide means whereby bottom 50 is permitted to only come within a certain minimum distance of bottom wall 28, which distance may range from about 0.062 of an inch to as much as 0.125 of an inch. To assure that this distance is maintained during each heat of the mold, mechanical stops 56,58 which may be constructed in any convenient manner, are provided on side wall 30 adjacent bottom wall 28 for coaction with bottom 50 of ram C. Once bottom 50 engages stops 56,58, the raw material flow has been completed. The mold and ram are retained in this closed position while at least the cavities are heated, generally to a temperature of 250° F, or above, to cure the rubber workpieces in the cavities. This curing is done in a known and accepted manner. Following curing, the mold is moved vertically downward in the direction $b$ of FIG. 1 so that spaces are again provided between ram C and upper mold half A, and upper mold half A and lower mold half B. The cured workpieces are then removed from the mold cavities for further processing and finishing and the material remaining in the sprues, runners and reservoir is removed and scrapped. As this material is also cured when the workpieces are cured, there is no present way to reprocess it for any further use.

With particular reference to FIGS. 2 and 3, the subject invention overcomes the need for using mechanical stops 56,58 and successfully provides a reduction in the scrap material generated during each heat of the mold. Mold components shown in FIGS. 2 and 3 which are identical to mold components in FIG. 1 have like numerals and new components have new numerals. In FIG. 2, there is seen upper mold half A which includes top portion 10 having disposed therein reservoir 22 including bottom wall 28 and continuous side wall 30. Disposed in bottom wall 28 are 16 sprue holes generally designated 60 which include a smaller diameter portion 62 and a generally conical lead-in end portion 64 as is known in the art. These sprue holes are symmetrically spaced in the bottom wall to equalize the forces required and to assure consistent material flow. Disposed between each of these sprue holes, at the lead-in portions, are a plurality of channel areas 66 formed directly into bottom wall 28 which are open therealong upwardly toward the top of the mold. Although these channel areas may be positioned as required for permitting desired material flow therealong within the entire reservoir, in the preferred embodiment, each sprue hole is interconnected with its immediately adjacent sprue hole by one of these channels. Also in the preferred embodiment, it is seen that these channels extend parallel and perpendicular to each other so as to form generally rectangular patterns in bottom wall 28; however, it will be appreciated that more than one channel could be used to extend between adjacent sprue holes and that the channels could also be disposed relative to each other at angles different than the ones shown in the drawings. It is merely necessary to include that number which are so positioned in order to permit the desired consistent material flow within the reservoir. It has been found that a single channel extending between adjacent sprue holes and having a cross sectional radius of 3/16 of an inch to a depth of 0.100 of an inch is adequate for providing the desired material flow.

As shown best in FIG. 3, and utilizing the same process steps hereinabove described with referenc to FIG. 1, it will be seen that mechanical stops 56,58 are no longer utilized so that bottom 50 is permitted to physically contact bottom wall 28. Channels 66 provide means whereby the raw material (not shown) is permitted to flow within the reservoir and between the plurality of sprue holes, even when the ram is brought into a closely spaced relationship with bottom wall 28. Thus, the amount of raw material required to be placed in the reservoir to insure desired material flow into the workpiece forming cavities is reduced and substantially the only material remaining following a heat is the material in channels 66 and sprue holes 60. As a practical matter, however, sufficient raw material is included with the predetermined amount initially loaded into the reservoir such that bottom 50 does not actually contact bottom wall 28 and there is thus formed a thin connecting layer of material formed between the channels during the molding process. This extra material assures that all the workpiece forming cavities will be completely filled during the heat.

The scrap ram flash generated in using the concepts of the subject invention is shown in FIG. 4 wherein the material remaining in channels 66 following a heat is designated 66', the material remmaining in sprue holes 60 is designated 60' and the thin layer extending between channel scrap 66' is designated 28'. Again, this scrap ram flash is not reprocessable as it too is cured during curing of the workpieces themselves as hereinabove described. It should be noted that, in practice, the thickness of portions 28' are often only 0.005 of an inch and the thickness of portions 66' are substantially identical with the depth of the channels.

In using the previous type of transfer mold arrangement, as described hereinabove with reference to FIG. 1, approximately 10 percent of the uncured rubber originally placed in the reservoir is discarded as unreprocessable scrap. Although 10 percent may not, at first blush, seem particularly high, uncured rubber of the type which is commonly used in transfer molding operations costs approximately $3.00 per pound so that any reduction of this waste will yield substantial savings over a period of time for high volume jobs. In molds using the concepts of the subject invention, it has been found that there may be realized a 20 to 30 percent reduction in the scrap ram flash generated per heat, or a reduction of from 2 to 3 percent of the total raw material required. That is, for each 1,000 lbs. of raw material required when using previous ram transfer molds, the amount of material required for molds incorporating the subject invention provides a material reduction of from 20 to 30 lbs. for molding the same number of parts. At $3.00 per pound, this represents a savings of $66 per every 1,000 lbs. of raw material processed. When considering this in light of the fact that many of the parts molded using ram transfer molds are extremely high volume jobs, it will be appreciated that substantial long term savings will be realized.

The invention has been described with reference to the preferred embodiment. Obviously, modifications and alterations will occur to others upon the reading and understanding of the specification. It is my intention to include all such modifications and alterations insofar as they come within the scope of the appended claims or the equivalents thereof.

Having thus described my invention, I now claim:

1. In a ram transfer mold including a material reservoir having a bottom wall and adjacent side walls, a plurality of sprue holes disposed in said bottom wall to extend between and interconnect said bottom wall and a plurality of workpiece forming cavities within the mold and a ram member receivable in a close-fitting relationship with said side walls and spaced from said bottom wall a predetermined minimum distance for permitting a raw material flow throughout said reservoir and between said sprue holes whereby said ram forces raw material confined in said reservoir to flow laterally to and through said plurality of holes and into the associated workpiece forming cavities to form a ,lurality of plurality the improvement comprising:
   means comprising open channel areas formed in the surface of said bottom wall and interconnecting said sprue holes for permitting flow of said raw material within said reservoir and between said plurality of sprue holes when said ram is spaced from said bottom wall 'ess than said minimum distance.

2. The improvement as defined in claim 1 wherein each said sprue hole is interconnected with at least each immediately adjacent sprue hole by at least one of said channel areas.

3. The improvement as defined in claim 2 wherein said sprue holes are symmetrically spaced in said bottom wall and said channel areas form a plurality of rectangular shaped configurations therein.

4. The improvement as defined in claim 1 wherein said ram contacts said bottom wall when said ram is moved to said dIstance less than said minimum distance.

* * * * *